United States Patent [19]

Kelm

[11] 4,126,178
[45] Nov. 21, 1978

[54] MULTIPLE FLUID FLOW PATH BODIES

[75] Inventor: Everett F. Kelm, Corning, N.Y.

[73] Assignee: Corning Glass Works, Corning, N.Y.

[21] Appl. No.: 780,471

[22] Filed: Mar. 23, 1977

Related U.S. Application Data

[62] Division of Ser. No. 660,879, Feb. 24, 1976, Pat. No. 4,041,592.

[51] Int. Cl.² .............................................. F28D 17/00
[52] U.S. Cl. ........................................ 165/165; 165/10
[58] Field of Search ....................... 165/157, 166, 165; 65/33

[56] References Cited

U.S. PATENT DOCUMENTS

| | | | |
|---|---|---|---|
| 2,983,485 | 5/1961 | Peterson | 165/166 |
| 3,022,982 | 2/1962 | Demalander | 165/157 X |
| 3,112,184 | 11/1963 | Hollenbach | 165/10 |
| 3,266,568 | 8/1966 | Butt et al. | 165/166 |
| 3,322,189 | 5/1967 | Topouzian | 165/8 |

Primary Examiner—Charles J. Myhre
Assistant Examiner—Theophil W. Streule, Jr.
Attorney, Agent, or Firm—Richard N. Wardell; Clarence R. Patty, Jr.

[57] ABSTRACT

A heat exchange element, particularly suitable for use as a recuperator for external combustion engines or other multiple fluid flow path body, may be produced as a monolithic, ceramic, honeycombed body having a plurality of flow paths therethrough for two or three fluids wherein multiple flow paths of separate fluids are separated by walls which may be less than 10 mils thick.

The honeycombed ceramic body is provided with a plurality of open-ended cells extending from one face end to another face end and arranged in vertical columns of cells separated by vertical fluid barrier wall surfaces. Selected columns of open-ended cells are closed on both face ends of the body and entrance to and exit from the selected cells is provided by removing portions of cell walls near face ends of the body between fluid barrier wall surfaces. A first fluid may enter the selected columns of cells through inlet openings on the top and bottom of the body at one end thereof and exit from the other end of the body through outlet openings also on the top and bottom thereof, thereby following I-shaped fluid flow paths. A second fluid may pass through unselected columns of cells. Three fluids may be accommodated by dividing the honeycombed body into independent upper and lower halves separated by an intermediate fluid barrier, thereby forming a combination of upper U-shaped and lower inverted U-shaped fluid flow paths in the selected columns of cells.

Fluids are applied to the heat exchanger or other body and removed therefrom through appropriate use of sealable header or flue assemblies communicating with all entrance or exit openings.

3 Claims, 6 Drawing Figures

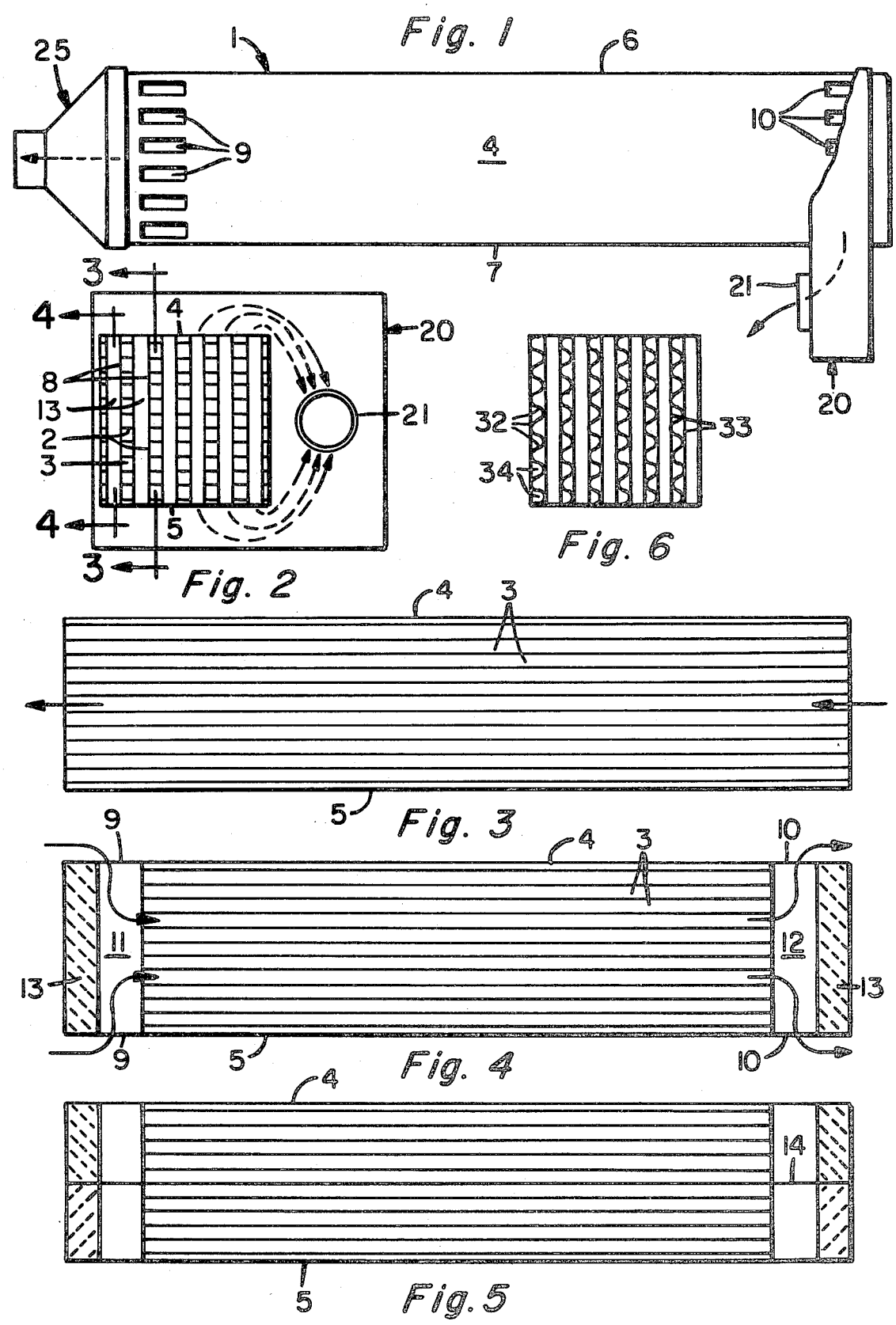

MULTIPLE FLUID FLOW PATH BODIES

This is a division of application Ser. No. 660,879, filed Feb. 24, 1976, and now U.S. Pat. No. 4,041,592.

BACKGROUND OF THE INVENTION

The invention relates to multiple fluid flow path bodies and in particular to a fixed recuperative heat exchange device for use in turbine or Stirling cycle engines.

In a gas turbine engine, an air-fuel mixture is burned in a combustion chamber to form hot gases which are directed to a turbine wheel to produce rotary motion of an engine output shaft. After these gases have impinged upon the turbine wheel, and prior to their being exhausted from the engine, it is desirable to extract as much heat energy as possible. The efficiency of the gas turbine engine is increased by transferring the heat energy extracted from these exhaust gases to the compressed intake air prior to its mixture with the fuel and entry into the combustion chamber. One type of heat exchanger that is used to accomplish this energy transfer and raise the temperature of the incoming compressed air is called a rotary regenerator.

This heat exchange system which employs a rotating cylindrically-shaped regenerator core has in the past been found to be suitable for gas turbine engines. Typically, this regenerator core is made from a ceramic material and is porous to gases which flow substantially parallel to the rotational axis of the core. The porous, ceramic regenerator core rotates in a housing that is divided into a plurality of passages. Hot exhaust gases and the cooler compressed incoming air pass through these passages and through the porous regenerator core. The exhaust gases heat the regenerator core and the regenerator core, in turn, transfers this absorbed heat energy to the cooler compressed incoming air. In this manner, heat transfer results.

As is evident, this type of rotary regenerator unfortunately requires many accessory items to function properly, such as, drive mechanisms, motors and annular ring gears for rotating the core and rubbing seals and special housings for sealing the different sections of the core and the entire core from the rest of the engine. Additionally, material requirements of thermal shock resistance, light weight, rigidity against fluid pressure, strength for rotation drive and sealability severely reduce the field of candidate materials for regenerator use.

One embodiment of the present invention is concerned with a fixed recuperator which does not require movement and therefore does not require the use of all the accessories named. It also enlarges the field of possible materials by eliminating some physical property requirements.

Metal recuperators of the type have been used in the past, for example see U.S. Pat. No. 3,322,189, but they are not capable of being used in very high temperature environments, are difficult and expensive to build, and are cumbersome and inflexible in design, particularly with regard to the flow path of the fluids.

In general, the multiple flow path body of present invention may be used as a recuperator as mentioned above or as a heat exchanger or afterburner to reduce energy requirements for maintaining combustion in industrial ovens for baking, oxidizing, polymerizing or removing coatings, in organic waste incinerators, in foundry cupulos, and in internal combustion engines. In addition to operating as a heat exchanger, it may also be used in filtration and osmosis when porous materials are used to produce the honeycombed body.

SUMMARY OF THE INVENTION

It is an object of the present invention to provide a unique multiple fluid flow path body which may be used as a heat exchange, filtration or osmosis device having a plurality of closely adjacent flow paths for multiple fluids, selected ones of which constitute I-shaped fluid flow paths or a combination of upper U-shaped and lower inverted U-shaped fluid flow paths.

It is a further object of the invention to provide a fixed heat exchanger or recuperator which has improved monolithic honeycomb design for improved flow of heat transferring or heat absorbing fluids.

In accordance with the objectives, the invention is a multiple flow path body having a unique combination of contiguous flow paths for the exchange of energy or matter between two or three fluids or the filtering of a fluid between flow paths.

A novel, particularly advantageous, fixed heat exchange device or other multiple fluid flow path body comprises:

(a) a monolithic, honeycombed body having a matrix of thin walls forming a multiplicity of substantially parallel cells extending therethrough between opposed face ends and being bounded on sides generally parallel to cell axes by opposed upper and lower boundary surfaces and opposed first and second side boundary surfaces connecting upper and lower boundary surfaces, (i) the cells being grouped into a plurality of columns of cells, each column being separated from adjacent columns of cells by a fluid barrier wall surface extending continuously from the upper boundary surface to the lower boundary surface and from one face end of the honeycombed body to the other face end thereof, (ii) selected columns of cells being closed against fluid passage on both face ends and opposite ends of cells thereof being spaced from the adjacent closed face ends thereof, the spaces in those columns between those ends of cells and the adjacent closed face ends constituting fluid flow conduits communicating with the cells in those columns, while the cells of unselected columns of cells are open-ended, and (iii) the honeycombed body further having openings in the upper and lower boundary surfaces near the face ends communicating with the fluid conduits adjacent respective face ends, thereby providing, in the body, fluid flow paths through the boundary surface openings and the fluid flow conduits to cells in the selected columns of cells near the one face end of the honeycombed body, through the cells, and from the cells in the selected columns of cells through the fluid flow conduits and the boundary surface openings near the other face end of the honeycombed body;

(b) means sealably fixed to the honeycombed body for communicating fluid to the openings in the upper and lower boundary surfaces at the one face end of the honeycombed body, and (c) means sealably fixed to the honeycombed body for recovering fluid from the openings in the upper and lower boundary surfaces at the other face end thereof.

The novel fixed recuperator or other multiple fluid flow path body is produced according to one alternative of the invention by providing openings in both the upper and lower boundary surfaces at entrance and exit ends (i.e., respectively adjacent different ones of the opposed face ends) thereby providing first fluid flow paths which resemble a reclining "I" with the entrance and exit fluid flow conduits tracing out the horizontal upper and lower bars of the "I" and the open-ended cells of the selected columns tracing out the connecting vertical body of the letter "I." In this alternative, each conduit extends adjacent a face end from one of the openings in the upper boundary surface to one of the openings in the lower boundary surface between opposed fluid barrier wall surfaces in a selected column.

Delivery of the first fluid from a first fluid source to the first fluid entrance openings and recovery of the first fluid from first fluid exit openings is provided by first fluid entrance and exit headers or flues sealed to the honeycombed body and enclosing, respectively, entrance and exit openings. Delivery and recovery of a second fluid may be provided by second fluid entrance and exit flues sealably enclosing both selected closed cells and unselected open-ended cells on opposed end faces of the honeycombed body. Countercurrent flow is preferred so that the first fluid entrance and the second fluid exit would occur at the same end of the honeycombed body and the first fluid exit and the second fluid entrance would occur at the other end of the honeycombed body.

A further alternative of the invention comprises providing the honeycombed body with a fluid barrier surface extending between opposed face ends and opposed side boundary surfaces of the honeycombed body intermediate of and generally parallel to the upper and lower boundary surfaces. Entrance and exit openings are then provided respectively adjacent opposite face ends, through both upper and lower boundary surfaces such that paths for three fluids are provided. First and third fluids may flow within selected columns, in upper "U" and lower inverted "U" shaped paths, respectively, and a second fluid may pass directly through unselected cells allowing appreciable exchange between first and second and second and third fluids.

DESCRIPTION OF THE DRAWINGS

FIG. 1 is a top view of the multiple flow path body of the invention with only exit flues for first and second fluids sealably attached to ends of the honeycombed body. Similar entrance flues would normally be used in actual operation.

FIG. 2 is a face end view of the 6 ft face end of assembly of FIG. 1 but without the second fluid flue which would otherwise enclose the face end in actual use.

FIG. 3 is a cross-sectional view cut through an unselected column of open-ended cells of FIG. 2 through which the second fluid may flow.

FIG. 4 is a cross-sectional view cut through a selected column of cells, the fluid conduits, and the end seals of FIG. 2 and showing the paths through which the first fluid may flow.

FIG. 5 is a cross-section view of an alternative embodiment wherein the cross-section is taken through a selected column of cells and wherein an intermediate fluid barrier surface parallel to the upper and lower boundary surfaces separates the honeycombed body into upper and lower units for separate flow of two fluids in selected cells.

FIG. 6 is a free end view of an alternative honeycomb element wherein the honeycombed body is a laid-up structure rather than an extruded structure as in FIG. 2.

DETAILED DESCRIPTION OF THE INVENTION

Looking at FIGS. 1 and 2, the multiple flow path body of the invention is shown as a honeycombed body 1 with first fluid exit flue 20 and second fluid exit flue 25. Similar entrance flues on ends opposite the exit flues have been omitted for clarity. Choice of parallel or countercurrent flow of the two fluids determines whether first and second fluids enter at the same end or at opposite ends of the honeycombed body, but the preferred countercurrent flow design is primarily described herein and is shown by the solid and broken arrows in the views.

The honeycombed body is an extruded body having thin cell walls 2 forming an array or matrix of square cells 3 extending the length of the body from one face end shown in FIG. 2 to the other face end at the opposite end of the body. The honeycombed body is bounded by cell walls or a separate skin forming an upper boundary surface 4, lower boundary surface 5 and opposed first and second side surfaces 6, 7, in this case forming a body with a rectangular (square) cross-section. The cells are grouped into columns of cells which are separated from adjacent columns of cells by fluid barrier wall surfaces 8. The fluid barrier wall surface may be a composite of the thin walls of the cells in the column, as shown, or a separate wall may be formed. It is preferred, through not necessary, that the cell walls and fluid barrier wall surface be planar and parallel to one another; however it is only necessary that columns of cells be separate from adjacent columns for independent flow of fluids. Methods of fabricating laid-up and extruded type structures are exemplified by the disclosures of U.S. Pat. Nos. 3,112,184 and 3,790,654, which are incorporated herein by reference.

Entrance openings 9 and exit openings 10 are provided through upper boundary surface 4 and through lower boundary surface 5 into selected columns of cells. Entrance and exit openings in both surfaces, as shown in the Figures, would provide an "I" shaped flow path. Every other column of cells may be selected as shown in the Figures, giving a ratio of selected cells for first fluid flow to unselected cells for second fluid flow of 1:1, or some other pattern of selections may be made giving other first fluid cell to second fluid cell ratios, such as 1:2 or 2:1, usually for providing for different quantities or pressure drop of first and second fluids passing through the honeycombed body.

The first fluid is applied to first fluid entrance openings and recovered from first fluid exit openings by means of the first fluid extrance and exit flues 20 which are sealably attached to the honeycombed body. A metal flue may, for example, surround a ceramic honeycombed body and be sealed against a hot gas escape by means of asbestos or insulating refractory wool between the body and the flue. The flue 20 includes hole 21 for connecting to a fluid source (not shown) or to a fluid exhaust (not shown). The paths of the fluid from exit openings to the flue hole 21 are shown by the dotted arrows in FIG. 2. Other flues, headers, or manifolds which are known in the art for delivering and recovering fluids are equally useable with the multiple flow path body.

The second fluid may be applied and recovered from unselected cells at face ends of the honeycombed body by means of second fluid entrance and exit flues 25 which are sealed to the multiple flow path body in any convenient manner such as that suggested for the first fluid flues.

Open-ended cells for the passage of the second fluid appear in cross-section in FIG. 3 showing a section of the honeycombed body of FIG. 2 through an unselected column of cells. The fluid may enter and pass, as shown by the arrows, through any or all of the cells 3 in unselected columns when applied to the face end of the honeycombed body by the second fluid entrance flue.

FIG. 4 is a cross-sectional view of the honeycombed body of FIG. 2 showing the first fluid paths through cells of selected columns of cells. The fluid enters the honeycombed body through the entrance opening 9 in both upper and lower boundary surfaces 4, 5 and passes into entrance fluid conduit 11 which extends in each selected column of cells between fluid barrier wall surfaces and upper and lower boundary surface openings 9. The entrance fluid conduit gives the first fluid access to all the cells of the selected column so that multiple flow paths are available through the cells 3 to the other (exit) end of the body.

Near the other face end of the body, the first fluid passes out of the cells 3 and into an exit fluid conduit 12, which extends in each selected column of cells between fluid barrier wall surfaces and exit openings 10 in upper and lower boundary surfaces 4, 5, thence out of the honeycombed body through the exit openings to be recovered by the first fluid exit flue.

The fluid conduits 11, 12 are produced near face ends of the honeycombed body by forming fluid flow grooves between upper and lower boundary surfaces by removing portions of cell walls joining the opposed fluid barrier wall surfaces in selected columns of cells. This may be accomplished, for example, by drilling, punching or sawing from upper or lower boundary surfaces sequentially through one boundary surface, the cell walls and through the opposed boundary surface, in which case the entrance and exit openings are made in the boundary surfaces at the same time. In the alternative, the fluid flow grooves and entrance and exit openings may be made by sawing cell walls and boundary surfaces from each face end toward the other face end parallel to and between the barrier wall surfaces in the selected columns.

To transform the fluid grooves into fluid conduits 11, 12 and to prevent flow of the second fluid into selected columns of cells (as in FIGS. 4–5), the fluid grooves are enclosed near face ends of the honeycombed body between the fluid barrier wall surfaces along the length of the fluid flow grooves in selected columns of cells. The groove may be enclosed by sealing with ceramic slip, ceramic cement, wax, plastics, rubber, or any other material 13 which is compatible with the honeycombed body, essentially non-porous, and which will be chemically, mechanically and thermally resistant to the fluid and atmosphere during use. Compatibility includes considerations of the thermal expansion for high temperature use.

As shown in FIG. 4 the sealing material 13 is forced into selected columns at a depth less than the depth of the fluid flow grooves. The sealing material may be advantageously urged into these columns as a fluid using a method disclosed and claimed in a co-pending application Ser. No. 660,880 which is incorporated herein by reference, filed Feb. 24, 1976 in the name of D. A. Noll, et al. and now U.S. Pat. No. 4,041,591.

FIG. 5 shows a cross-sectional view through a selected column of cells in an alternative multiple flow path body. The body is similar to that of FIG. 4 but has an intermediate fluid barrier 14 generally parallel to the upper and lower boundary surfaces 4, 5 extending from the first side to the second side and from the one face end to the other face end of the body. This intermediate barrier essentially separates the body into upper and lower units and allows first and third fluids to flow separately through selected columns of cells in upper and lower units while not affecting the flow of the second fluid through unselected cells in both upper and lower units.

FIG. 6 shows the face end view of a laid-up honeycombed body which is fabricated by stacking alternate layers of flat 33 and corrugated 32 sheets of green ceramic material. Rounded cells 34 are grouped in columns by the flat walls 33 which act as fluid barrier wall surfaces. Alternate selected columns of cells are sealed.

EXAMPLE OF THE PREFERRED EMBODIMENT

The honeycombed body of the invention may be made of metal, plastic or ceramic materials, the latter group being preferred and being exemplified by a family of low expansion cordierite materials disclosed in U.S. Pat. No. 3,885,977 and useful in high temperature recuperators of the present invention. Ceramic or metal powders and heat-softened plastics are preferably extruded as plastically deformable batches into monolithic honeycombed bodies in the manner disclosed in previously incorporated U.S. Pat. No. 3,790,654.

A honeycombed ceramic body may be extruded according to the teaching of previously incorporated U.S. Pat. No. 3,790,654 using a cordierite composition similar to body F of U.S. Pat. No. 3,885,977. The low expansion cordierite has a chemical composition of 49.6% $SiO_2$, 35.9% $Al_2O_3$, and 14.5% $MgO$ and is useful in moderately high temperature applications (below about 1500° C.).

Such a body as above described may be tested as a heat exchanger (recuperator) using hot-burned natural gas as the first fluid and cold blown air as the second fluid. A 2-inch square, sintered cordierite body, 20 inches long and having about 225 square cells per square inch with 10 mil thick walls separating the cells may be modified according to the invention by cutting the upper and lower surfaces and horizontal cell walls from face ends to a depth of about one inch between vertical cell walls in alternate columns of cells and then cementing the face end of the body in the selected columns of cells to a depth of about one-eighth inch with high temperature ceramic cement. The cement may then be sintered and a metal air flue attached at each end of the body and sealed to the body with refractory wool fiber to provide a means of applying the hot gases to the first fluid flow paths through the honeycombed body.

Using the above model, hot air may enter the first fluid entrance openings at about 800–850° C. while a stream of cold air is directed toward the entire face end and enters the open-ended cells at the other end of the body at about 20°–25° C. The fluids pass in countercurrent fashion through the body and may be collected at opposite ends when the temperature of the "hot" gas is 30°–60° C. and the temperature of the "cold" air is 400°–450° C. Flow rates may be adjusted to provide for different temperatures at the exit ends but the above data are representative of the magnitude of heat exchange that may take place over a short path length.

In accordance with an improved sealing method disclosed and claimed in the previously noted co-pending D. A. Noll, et al. application, all the cells on each face end of the honeycombed body may be sealed by dipping the body into a heat-softened thermoplastic material. Thereafter, the body is cooled and selected columns of cells may be cut, in the process removing the stiff thermoplastic material and portions of the cell walls and boundary surfaces from the selected columns. The body is then re-dipped into a final commercially available high-temperature cement sealing material and the cement is sintered while the thermoplastic material is removed from the remaining cells by a heat treatment. Alternatively, the fluid flow grooves may be formed before the wax dip, after which the fluid wax may fill all the cells and then be selectively blown out of the selected columns. The remaining wax is then allowed to cool and the body is dipped into the final cement and the cement sintered.

I claim:

1. A triple fluid flow path body comprising
   (a) a monolithic, honeycombed body having a matrix of thin walls forming a multiplicity of substantially parallel cells extending therethrough between opposed face ends of the honeycombed body and being bounded on sides generally parallel to cell axes by opposed upper and lower boundary surfaces and opposed first and second side boundary surfaces connecting upper and lower boundary surfaces,
      (i) the cells being grouped into a plurality of columns of cells, each column being separated from adjacent columns of cells by a vertical fluid barrier wall surfaces extending continuously from the upper boundary surface to the lower boundary surface and from one face end to the other face end,
      (ii) selected columns of cells being closed against fluid passage on both face ends and opposite ends of cells thereof being spaced from the adjacent closed face ends thereof, the spaces in those columns between those ends of cells and the adjacent closed face ends constituting fluid flow conduits communicating with the cells in those columns, while unselected columns of cells are open-ended to form separate first fluid flow paths,
      (iii) the honeycombed body further having openings in the upper and lower boundary surfaces, near the face ends communicating with the fluid flow conduits adjacent respective face ends, thereby providing in the body fluid flow paths through the boundary surface openings and the fluid flow conduits to cells in the selected columns of cells near the one face, through the cells, and from the cells in the selected columns of cells through the fluid flow conduits and the boundary surface openings near the other face end, and
      (iv) the body having a lateral fluid barrier surface extending between opposed face ends and opposed side boundary surfaces intermediate of and generally parallel to the upper and lower boundary surfaces, which lateral surface divides the body into upper and lower portions that respectively have separate upper U-shaped second and lower inverted U-shaped third fluid flow paths through the selected columns.

2. The body of claim 1 wherein the selected columns alternate with the unselected columns in a ratio ranging from 1:2 to 2:1.

3. The body of claim 1 wherein the selected columns alternate with the unselected columns in a ratio of 1:1.

* * * * *

UNITED STATES PATENT OFFICE
CERTIFICATE OF CORRECTION

Patent No. 4,126,178          Dated November 21, 1978

Inventor(s) Everett F. Kelm

It is certified that error appears in the above-identified patent and that said Letters Patent are hereby corrected as shown below:

Column 3, line 52, remove "6 ft" and insert -- left -- .

Column 3, line 62, change "cross-section" to -- cross-sectional -- .

Claim 1, (i), line 4, change "surfaces" to -- surface -- .

Signed and Sealed this

Twentieth Day of March 1979

[SEAL]

Attest:

RUTH C. MASON
Attesting Officer

DONALD W. BANNER
Commissioner of Patents and Trademarks